United States Patent Office 3,232,924
Patented Feb. 1, 1966

3,232,924
TECHNIQUE FOR PREPARATION OF LOW-CHROMIUM GELATIN
Ronald E. Moses, East Boston, George A. Consolazio, Burlington, and Anastasios J. Paraskevas, Stoneham, Mass., assignors to General Foods Corporation, White Plains, N.Y., a corporation of Delaware
No Drawing. Filed July 7, 1960, Ser. No. 41,225
10 Claims. (Cl. 260—118)

This invention relates to the extraction of gelatin. More specifically it relates to the treatment of chrome stock in a manner to permit attainment of a gelatin having a low content of chromium.

As is well known, the stocks from which gelatin may be extracted include materials many of which are by-products from various sources. Techniques have been developed which can be used to treat gelatin charge stocks depending upon the particular stock. For example, there are preferred techniques for obtaining gelatin from (a) ossein, (b) pigskins, and (c) tanner's stock, typified by so-called lime splits.

Tanner's stock is one of the more preferred sources, and lime splits may account for a good portion of the charge stock to a gelatin-producing operation; there are several types of tanner's stocks which must be segregated. Most generally recognized is chrome stock including chrome splits, shavings, parings, trimmings, etc. This material arises as a by-product from tanning operations wherein various chromium salts are added to the skins in order to impart desired properties thereto. This tanner's stock known as chrome stock may contain 10,000–50,000, commonly 30,000 parts per million of chromium.

If such a stock were subjected to a more-or-less standard gelatin extraction operation (similar to that employed, for example, with lime splits) the ultimate gelatin product would be characterized by a chromium content which would be measured in terms of thousands of parts per million, and this would impart a blue-green color to the gelatin. This would render the product unsuitable for all edible uses and would considerably minimize its other uses.

As a result of these deficiencies arising from the properties of gelatins prepared from chrome stock, such materials have been generally considered by those skilled-in-the-art to be of no practical value for edible uses. Accordingly chrome stock is not generally employed as a raw material for production of edible products. Despite the fact that the cost of chrome stock may be substantially lower than the cost of other tanner's stock or of lime splits, the material has not been generally considered as a charge stock to a gelatin extraction operation.

Various prior art investigators have heretofore tried to extract gelatin from chrome stock. Typical of the prior art processes is that set forth in U.S.P. 1,629,556 to Underwood wherein chrome stock is subjected to liming "in the same manner as ordinarily employed" (i.e. for periods up to 120 days). The limed stock is then washed for 24 hours with water, following which the stock is treated with a salt solution (typically 1% by weight of stock of magnesium sulfate) which reacts with the lime present to form magnesium hydroxide at pH of approximately seven during about 24 hours contact time. The stock is then treated to extract gelatin by cooking in kettles at 160° F. or lower to extract gelatin. The magnesium hydroxide is said to provide the necessary alkalinity when the stock is cooked to set free the gelatin or glue and prevent the solution of the chromium with the glue or gelatin. Although the patent does not disclose this fact, it is well-known that gelatin from such a treatment may contain chromium in large amounts, typically above 50–100 p.p.m. or more which renders the gelatin unfit for human consumption.

Another prior art technique for treating chrome stock is that of U.S.P. 1,612,746 to Rinck wherein chrome stock is boiled in water in open vessels in the presence of 1%–2% ("calculated to the raw material" i.e. to the wet stock) burnt magnesite (magnesium oxide) at an alkaline pH, the magnesium preventing the solution of chromium during extraction of gelatin over a period which may be as long as about one hour but typically less. Gelatin which may be prepared by this technique may contain chromium in amount of at least 20–50 p.p.m. and up to as high as 200 p.p.m., and this renders it undesirable for human consumption.

A more recent patent which is directed to solving the same problem is U.S.P. 2,397,650 to De Beukelaer which mentions the earlier-tried technique of using magnesium oxide, apparently referring to the Rinck patent supra.

Although these disclosures may make reference to the production of a gelatin which is free of chromium, none discloses the chromium content of the product gelatin. In many cases, it would appear that the chromium content was visually measured. Under the most favorable conditions, which are only infrequently present, visual techniques will only respond to chromium concentrations of greater than about 100 p.p.m.

There does not appear to be any absolute standard as to the amount of chromium which may be present in a gelatin which is to be used in an edible product. However, it is commonly believed that a gelatin, to be satisfactory on this count, should have a chromium content of less than about 10 p.p.m. of chromium. Although it will be apparent that the process of the instant invention may be conducted so as to give a gelatin product having a greater chromium content than 10 p.p.m., it will preferably be conducted to yield a product below this level. The term "chromium-free gelatin" may be used to designate such products.

Although to those not familiar with the art these hereinbefore noted disclosures might appear to solve the problem of producing chromium-free gelatin from chrome stock, it is well known to those skilled-in-the-art that they have not solved the problem, i.e. they have not permitted attainment of a chromium-free gelatin from chrome stock. This has not been done despite the fact that this raw material is a very large potential source (not presently employed) of gelatin and may be obtained at price which may substantially be lower than that of the lowest cost material presently employed. Accordingly as far as is known, there is today no commercial plant in America producing edible gelatin from chrome stock.

It is an object of this invention to permit treatment of a chromium-containing gelatin charge stock to attain a chromium-free gelatin product. Other objects will be apparent to those skilled-in-the-art on inspection of the following description.

In accordance with certain of its aspects, the process of this invention for obtaining a chromium-free gelatin from chrome stock includes the steps of precipitating aluminum hydrate in the presence of the chrome stock whereby chromium is fixed on said stock, subjecting said stock to contact with aqueous extraction liquid thereby forming an extract liquor containing a chromium-free gelatin, separating said stock from said extract liquor, and drying said extract liquor to form a chromium-free gelatin.

Although the instant process may be employed in connection with any leather waste typified by tanner's stock, the advantages of this invention are particularly apparent when the process is applied to by-products from chrome tanned leather operations—particularly chrome leather scrap, shavings, trimmings, etc., preferably shavings, and accordingly the invention will be described in connection therewith. This chrome stock may have a chrome content of typically 10,000–50,000 p.p.m., commonly 30,000 p.p.m. or more (on a dry basis).

It will be apparent that the operating conditions may be modified depending on the type of stock employed. The preferred stock may be chrome shavings which commonly may for example have a width of about 5–10 mm., a thickness of the order of 1 mm., and a length of e.g. 5–25 cm. Typically such a stock may be a heterogeneous mixture including, e.g. dust fines, etc.

In practice of this invention, it is preferred to subject the fresh chrome stock to washing, preferably with hot water, to remove surface-adsorbed salts, typically sulfates and chlorides. This may be effected batchwise by placing 100 parts by weight aliquots of chrome stock in a steam-jacketed, false-bottom, tank bearing an agitator. Preferably the tank is filled with water at 140° F.–150° F., in amount of 400 to 600, say 500 parts by weight of the stock—which water will cover the stock. After a period of 30 minutes to 60 minutes, say 45 minutes of agitation, the water may be drained, and the tank refilled. Subsequent filling and draining for 7 to 12, say 9 times, over a 6 hour to 10 hour, say 8 hour period, will be sufficient to lower the salt content of the stock from its initial value of e.g. 7% to 12% or higher, say 11% down to a final value which permits attainment of a gelatin product having an acceptable ash content. Water washing in this manner also facilitates production of a product gelatin which may a chrome content of less than about 5–10 p.p.m. and as low as 1–2 p.p.m. or less. Water washing will lower the chromium content of the chrome stock.

It will be apparent to those skilled-in-the-art that the water which is employed should preferably contain a minimum of sediment or heavy metals such as iron, copper, lead, chromium, etc., because these materials interfere with the production of chromium-free gelatin by this process. Carrying out the process of this invention does not require the use of distilled or de-ionized water. Generally it may be possible to employ city water. In certain cases where the available water supply may contain a relatively high content of iron, copper, lead, chromium or algae, preliminary purification etc., of the water may be highly desirable in order to permit attainment of a chromium-free product gelatin.

In accordance with this invention, the washed stock (per 100 pounds of as-received stock which will now have increased in weight) may be mixed with 250–500, say 300 parts by weight of water and a soluble aluminum salt may be added thereto. It will be apparent that the soluble aluminum salt may be added to the water to form a solution therein or that it may be separately added as solid, or that it may be added in both ways.

The preferred aluminum salt may be aluminum sulfate, although aluminum chloride, aluminum ammonium sulfate (alum), potassium aluminum sulfate (potassium alum), sodium aluminum sulfate (sodium alum) and other aluminum salts may be employed. The amount of aluminum salt may be varied. In the case of aluminum sulfate, a concentration of 4% (based on the as-received stock) was found satisfactory. This was 9% by weight of the stock on a dry basis.

In the preferred embodiment, the chrome stock will be permitted to remain in contact with the aluminum salt-containing liquor until the latter saturates the fibers of the stock. Typically contact may be for example 5 hours.

The aluminum-saturated stock may be treated to raise its pH to 3–10, but more preferably 5–9, say 8 to precipitate an aluminum hydrate precipitate. This may be effected by use of a base such as trisodium phosphate, sodium carbonate, ammonium carbonate, sodium hydroxide, or ammonium hydroxide; it is most preferably done by use of ammonium hydroxide. Raising the pH to this point will precipitate aluminum hydrate within the interstices of the stock and on the surface thereof. If other anions are present, e.g. phosphates, they may be incorporated within the aluminum hydrate floc. The so-treated stock then may be drained free of any excess of aluminum salt or other soluble anions and cations by removing the liquid if desired, but it may not be necessary.

At this point additional quantities of aluminum salts may be added. Preferably this additional salt will be the same as before, i.e. preferably aluminum sulfate; preferred amount added may be 4% (on the same basis as before).

The stock may then be prepared for extraction by readjustment to pH of 3 to 10, preferably 5–9, say 8.0 by addition of appropriate amounts of base, typically ammonium hydroxide or others noted supra. Where the pH is adjusted by addition of ammonia or ammonium carbonate, the final gelatin will have a pH of about 6–7.

The stock (on the basis of 100 parts of original stock) may be extracted by addition thereto of 200 to 700, say 500 parts of water and cooking at an initial temperature of 130° F. for 1 to 4, say 2 hours to give a liquor having 3%–4% (or higher) gelatin concentration. Subsequent extractions with equal aliquots of water (preferably 5 to 10, say 7 in all) permit extraction of the available gelatin. Each of the later extractions may be conducted at higher temperature up to a final temperature of 200° F. to 212° F., say 212° F. Additional quantities of aluminum salt may be added to the second and later cooks to assist in attainment of the desired product. If desired, and depending upon the desired properties of the product, the extraction conditions may be modified. For example, the available gelatin may be extracted in a lesser number of cooks (e.g. 2) by operating at higher temperature, e.g. 195° F. In this case, the liquor concentration may be considerably higher.

The stock and aluminum hydrate may then be separated from the extraction liquor by filtration, preferably in a rotary drum vacuum filter. The filtered extract liquor as collected, having 3%–4% or higher gelatin concentration, may be concentrated to 25%–30%, further filtered, adjusted to neutral pH as by addition of acid, and then dried as by spray drying.

It is a feature of this invention that extractions can be regulated to permit attainment of a product gelatin having a wide range of physical properties, e.g. a very low bloom (e.g. less than 100) up to a very high bloom (e.g. to 250 or higher).

It is a particular feature of this invention that the gelatin product has a high clarity and an unusually low ash, typically less than 1%–2%. This may be due to the high ability of the aluminum hydrate precipitate to bond chromium, iron, etc. to the stock and to carry down with the precipitate substantially all the undesirable solubles and insolubles which may not be bound directly within the matrix. This action may result from various mechanisms, including co-precipitation, scavenging, flocculation, adsorption, absorption, sweeping, sequestration, etc. Regardless of the particular mechanism, however, the solution and the product gelatin are rendered free of chromium and other undesirable material.

This gelatin product finds use in a wide variety of products. For example, it may be used as a protein source agent in numerous foods or beverages; it may be used as an additive to gelatin desserts to provide better gel characteristics, etc.

It is a particular feature of the novel product of this invention that it may have a chromium content which is lower than that of gelatin prepared from the standard non-chrome stocks. For example, in five randomly selected samples of product prepared in accordance with this invention, the chromium content was 1.5, 0.7, 0.8, 0.3, and 0.2, averaging 0.7.

It is an unexpected feature of this invention that it is possible to produce a product so pure with respect to its chrome content, that special care must be employed in handling. For example, the amount of chromium which a solution of this gelatin product might pick up in ordinary processing or handling might under some conditions be far in excess of the quantity present after the instant treatment. The product is, with respect to its use, in all respects comparable to a gelatin of similar grade prepared from a non-chrome-containing stock.

In accordance with a specific embodiment of this invention, 100 parts of chrome stock (having a moisture content of about 55.6%) were placed in a steam-jacketed wash tank with 500 parts of water and maintained at 140° F.–150° F. for 45 minutes. The water was drained off and fresh water was added. This washing was repeated nine times over a period of eight hours. The water was then drained off. Testing of the wash water revealed that the salt concentration of the washed stock had been reduced.

Four parts anhydrous aluminum sulfate were dissolved in 100 parts of water with agitation. This corresponds to about 9% of the stock on a dry basis. The solution was added to the drained stock together with 200 parts of additional water. The liquid covered the stock in the vessel. The stock and the solution were allowed to soak for five hours. Ammonium hydroxide was added to raise the pH to 8 and aluminum hydrate precipitated within the interstices of the stock. When reaction was complete, the liquor was drained off.

Four additional parts of aluminum sulfate were dissolved in 100 parts of water with agitation and this solution was added to the stock together with 200 additional parts of water. The stock was allowed to soak again for five hours and then ammonium hydroxide was added to raise the pH to 8 as before. Aluminum hydrate precipitated within the interstices of the stock. When the reaction was complete, the liquor was drained off.

The stock was subjected to extraction at 130° F. for two hours in 500 parts of water. The water (now a gelatin solution) was withdrawn and the stock was again subjected to extraction in six more cooks each using the same amount of water for the same time, and each being at a somewhat higher temperature; the last temperature was 200° F.

The extract liquors from the seven cooks were combined, concentrated to 27% by evaporation of water, filtered, adjusted to pH 7 by addition of sulfuric acid, and dried by spray drying. The product gelatin had a chromium content of about 9 p.p.m., an exceptionally good clarity, an ash of 1%, a bloom of 100, and a viscosity of 20 mp.

Comparative experiments which might be made to compare prior art processes and the instant invention would show that only the latter is capable of producing a gelatin product containing such a low-chromium content. For example, the chromium content of the product of this invention if compared with typical chromium contents of prior art processes might show results which are tabulated as follows in Table I.

Table I

| Process: | Typical chromium content of gelatin product, p.p.m. |
|---|---|
| Instant invention | 0–10 |
| U.S.P. 1,612,746 to Rinck, example | 50 |
| U.S.P. 1,629,556 to Underwood | 50–100 |

It will be apparent to those skilled-in-the-art that none of the noted prior art processes which are directed to this subject matter make it possible to obtain a gelatin product which has a chromium content in the less-than-ten p.p.m. region. It has long been recognized that the problem of producing chrome-free gelatin can only be said to be successfully solved if it is possible to continuously produce a gelatin having such a low chromium content.

It will be apparent to those skilled-in-the-art that while this invention has been described with reference to specific examples, various modifications will be made thereto which fall within the scope of this invention.

We claim:

1. The method of obtaining low-chromium gelatin from chrome stock, which comprises washing said chrome stock without prior liming to remove salts therefrom, adjusting the pH whereby aluminum ions present form a precipitate of aluminum hydrate within and on said chrome stock thereby fixing chromium on said stock, subjecting said stock at a pH of 3 to 10 to contact with water at a temperature and for a time sufficient to extract gelatin from said stock and form an extract liquor containing gelatin, separating said stock from said extract liquor, and recovering gelatin from said liquor.

2. The method of obtaining low-chromium gelatin as claimed in claim 1 wherein said chrome stock is chrome shavings.

3. The method of obtaining low-chromium gelatin from chrome stock, which comprises washing said chrome stock without prior liming to remove salts therefrom, saturating said chrome stock with an aqueous solution containing a soluble aluminum salt, elevating the pH of said solution to a point sufficient to precipitate aluminum hydrate within and on said chrome stock, subjecting said stock at a pH of 3 to 10 to contact with water at a temperature and for a time sufficient to extract gelatin from said stock and form an extract liquor containing gelatin, separating said stock and said extract liquor, and recovering gelatin from said liquor.

4. The method of obtaining low-chromium gelatin as claimed in claim 3 wherein said aluminum salt is selected from the group consisting of aluminum-sulfate, aluminum chloride, aluminum ammonium sulfate, potassium aluminum sulfate, and sodium aluminum sulfate.

5. The method of obtaining low-chromium gelatin as claimed in claim 3 wherein the saturating of said chrome stock with aluminum salt is effected over a period of about 5 hours.

6. The method of obtaining low-chromium gelatin as claimed in claim 3 wherein the pH is raised to pH 3–10 to precipitate aluminum hydrate.

7. The method of obtaining low-chromium gelatin as claimed in claim 3 wherein the pH is raised with ammonium hydroxide.

8. The method of obtaining low-chromium gelatin as claimed in claim 3 wherein the pH is raised with trisodium phosphate whereby phosphates may be incorporated into said aluminum hydrate.

9. The method of obtaining low-chromium gelatin from chrome stock, which comprises washing said stock without prior liming to remove salts therefrom, saturating said washed stock with water containing a soluble aluminum salt, said aluminum salt being selected from the group consisting of aluminum sulphate, aluminum chloride, aluminum ammonium sulphate, potassium aluminum sulphate, and sodium aluminum sulphate, elevating the pH of the solution to about 5 to 9 to precipitate aluminum hydrate within and on said stock, adding water to said stock, cooking said stock at a temperature of about 130° to 212° F. to form an aqueous extract liquor containing gelatin, separating said stock and said extract liquor, and recovering gelatin from said liquor.

10. The method of obtaining low-chromium gelatin as claimed in claim 9, wherein washing of said chrome stock is effected with water at 140° to 150° F.

References Cited by the Examiner
UNITED STATES PATENTS

| | | | |
|---|---|---|---|
| 1,629,556 | 5/1927 | Underwood | 260—118 |
| 2,166,297 | 7/1938 | Jacquet | 260—118 |
| 2,132,822 | 10/1938 | Glass et al. | 260—118 |
| 2,309,340 | 1/1943 | Christopher | 260—118 |
| 2,751,377 | 6/1956 | Keil et al. | 260—118 |

WILLIAM H. SHORT, *Primary Examiner.*
L. ZITVER, *Examiner.*